United States Patent
Makowski et al.

[11] 3,821,149
[45] June 28, 1974

[54] PLASTICIZED THERMOPLASTIC SEMICRYSTALLINE BLOCK COPOLYMERS

[75] Inventors: Henry S. Makowski, Scotch Plains; Robert D. Lundberg, Somerville, both of N.J.

[73] Assignee: Esso Research and Engineering Company, Linden, N.J.

[22] Filed: Sept. 28, 1973

[21] Appl. No.: 401,627

[52] U.S. Cl. 260/30.6 R, 260/31.2 R, 260/31.8 HR, 260/31.8 PQ, 260/31.8 N, 260/31.8 Z, 260/33.6 R, 260/33.6 PQ, 260/33.6 UA
[51] Int. Cl. .... C08f 45/50, C08f 45/38, C08f 45/28
[58] Field of Search 260/33.6 PQ, 33.6 UA, 33.6 R, 260/31.8, 30.6, 873, 857 G

[56] References Cited
UNITED STATES PATENTS

| | | | |
|---|---|---|---|
| 3,231,635 | 1/1966 | Holden et al. | 260/880 |
| 3,355,513 | 11/1967 | Sadron et al. | 260/31.8 R X |
| 3,562,356 | 2/1971 | Nyberg et al. | 260/33.6 UA X |
| 3,761,458 | 9/1973 | Holler et al. | 260/886 X |

*Primary Examiner*—Lewis T. Jacobs
*Attorney, Agent, or Firm*—Robert J. Baran

[57] ABSTRACT

Novel plasticized thermoplastic copolymers are described wherein said copolymer is selected from the group consisting of block copolymers having the general formulae,
I. A-B-A
II. A-B-A-B-A
III. xB-[A-B]n-yA, and graft copolymers having the general formula

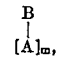

wherein m and n are integers greater than 1; $x$ and $y$ and 0 or 1, and $y$ is 0 when $n$ is 2; and A and B are mutually incompatible thermoplastic polymer blocks, wherein the A block is a crystalline phase or semicrystalline phase having a crystalline content of at least 25 percent and the B block is a substantially non-crystalline plastic, and said plasticizer is selected from the group consisting of plasticizers having a solubility parameter within 1.2 of the solubility parameter of said B polymer block. Preferably the A polymer block has a crystalline melting point of at least 35°C. and a molecular weight of at least 5,000 while the B polymer block is preferably prepared from vinyl aromatics and has a molecular weight of at least 5,000 and a glass transition of at least 35°C. In general from 25 to 300 parts per hundred plasticizer is added to the copolymers described above to prepare the novel compositions claimed herein.

In the most preferred embodiment the copolymers are: polyethylene-polystyrene-polyethylene, where the plasticizer is a non-volatile phthalate ester such as dibutyl phthalate or polyethylene-poly-t-butyl styrene-polyethylene where the plasticizer is an oil having a low aromatics content, for example, an oil of about 1-2 percent aromatic content, 10-13 percent paraffin content, and 82-88 percent naphthenic content.

25 Claims, No Drawings

PLASTICIZED THERMOPLASTIC SEMICRYSTALLINE BLOCK COPOLYMERS

FIELD OF THE INVENTION

Novel plasticized thermoplastic copolymers are described wherein said copolymer is selected from the group consisting of block copolymers having the general formulae, I. A-B-A
II. A-B-A-B-A
III. xB-[A-B]$_n$-yA, and graft copolymers having the general formula

wherein $m$ and $n$ are integers greater than 1; $x$ and $y$ are 0 or 1, and $y$ is 0 when $n$ is 2; and A and B are mutually incompatible thermoplastic polymer blocks, wherein the A block is a crystalline phase or semicrystalline phase having a crystalline content of at least 25 percent and the B block is a substantially non-crystalline plastic, and said plasticizer is selected from the group consisting of plasticizers having a solubility parameter within 1.2 of the solubility parameter of said B polymer block. Preferably the A polymer block has a crystalline melting point of at least 35°C. and a molecular weight of at least 5,000 while the B polymer block is preferably prepared from vinyl aromatics and has a molecular weight of at least 5,000 and a glass transition of at least 35°C. In general from 25 to 300 parts per hundred plasticizer is added to the copolymers described above to prepare the novel compositions claimed herein.

In the most preferred embodiment the copolymers are: polyethylene-polystyrene-polyethylene, where the plasticizer is a non-volatile phthalate ester such as dibutyl phthalate or polyethylene-poly-t-butyl styrene-polyethylene where the plasticizer is an oil having a low aromatics content, for example, an oil of about 1-2 percent aromatic content, 10-13 percent paraffin content, and 82-88 percent naphthenic content.

BACKGROUND OF THE PRIOR ART

French Patent 1,576,598 teaches the specific plasticization of copolymers. More specifically, the French patent teaches the two-block, three-block, graft and statistical copolymers, wherein the polymer blocks which make up the copolymer are present in separate distinct microphases, may be converted into novel compositions by the addition of a plasticizer which specifically plasticizes only one of the polymer blocks. The French patent teaches the equivalency of the above-described copolymer types and that either polymer block may be elastomeric. Finally, this patent teaches that either phase may be plasticized, thereby excluding crystalline blocks from being part of the copolymer.

U.S. Pat. No. 2,834,746 teaches that polystyrene may be grafted to polyethylene and the resulting graft polymer plasticized with mineral oil. This patent differs from the instant application in that graft copolymers wherein the crystalline polymer block, i.e., the polyethylene, is the backbone, are inoperable for the purposes of the instant invention. Finally, the amount of mineral oil incorporated in the compositions described in the above patent is substantially less than the compositions of the instant invention.

SUMMARY OF THE INVENTION

Novel plasticized thermoplastic semicrystalline block copolymers are disclosed wherein said copolymer is selected from the group consisting of block copolymers having the general formulae I. A-B-A
II. A-B-A-B-A
III. xB-(A-B)$_n$-yA, and graft copolymers having the general formula

wherein $m$ and $n$ are integers greater than 1; $x$ and $y$ are 0 or 1, and $y$ is 0 when $n$ is 2; and A and B are mutually incompatible thermoplastic polymer segments. Block copolymers according to Formula III which contain one or even two end blocks composed of B-segments are operable within this invention provided the end block B-segments do not exceed 35 percent by weight of the total amount of B-segments present in the copolymer. Thus, for example,

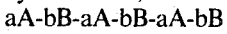

and

where $\epsilon a + \epsilon b = 100$ are operable even though they contain one and two end B-blocks, respectively. In any case, however, the most preferred block copolymers are those devoid of any end B-blocks.

In the compositions of the instant invention $m$ and $n$ are preferably less than 100, more preferably less than 25.

Polymer block A is a crystalline or semicrystalline polymer block which has a melting point of at least 35°C. and more preferably at least 50°C. Polymer block B is substantially non-crystalline and has a glass transition or softening point of at least 35°C. and more preferably at least 50°C.

It is an occasional occurrence in the science of block and graft copolymers to create phase separated copolymers wherein the various polymer blocks are incompatible and therefore manifest their softening point behavior characteristic of the homopolymer blocks. We observe that for this phase separation to occur between 2 substantially non-crystalline polymer blocks, A and B, it is essential that their structures be sufficiently dissimilar. We have observed that a quantitative measure of this structural dissimilarity can be established by the use of solubility parameter.

Solubility parameter is a term which has been widely employed to characterize quantitatively the polar characteristics of liquids and polymers. Small (J. App. Chem., 3, 71 (1953)) first employed this approach quantitatively to ascertain the solvent power of certain diluents for selected polymers and demonstrated the predictive capability of this tool. A rather complete list of solubility parameters for various liquids and polymers is found in the Polymer Handbook, Edited by Brandrup and Immergut, Wiley & Sons, 1966, p. IV – 341 to IV – 368. A summary of the utility of solubility parameters is also provided therein. It is also described how the solubility parameter can be calculated for those polymers and liquids for which values have not yet been determined.

All solubility parameter values cited hereinafter, whether determined experimentally or calculated, apply at 25°C.

With the information now available in the literature it is feasible to determine solubility parameters for nearly any polymer block which can be prepared. We have observed that in the case of substantially non-crystalline block copolymers, it is essential that the solubility parameters of the blocks be sufficiently different (at least 0.70 units and preferably greater than 1.0 units) in order to effect phase separation of the polymer blocks. (See, for example, U.S. Ser. No. 401,626, filed on the same day as the instant application in the names of H. S. Makowski and R. D. Lundberg.)

While these criteria for solubility parameter difference are very effective in defining a condition for phase separation for block copolymers composed of 2 substantially non-crystalline polymer blocks, there is a class of block copolymers which represent a marked exception. This class of block copolymers is that in which the A blocks are crystalline or semicrystalline and the B blocks are substantially non-crystalline. In this case of block copolymers we observe surprisingly that phase separation of the A block will occur provided that it has the requisite degree of crystallinity even when the solubility parameters of the two polymer blocks are quite close together. The reason for phase separation in this case is that the thermodynamic driving force for polymer crystallization, and therefore phase separation is greater than that achieved by a solution of one polymer block in the other. Thus the heat of crystallization in this case becomes larger in an absolute sense than the entropic value obtained in a random polymer solution.

In a practical sense these unexpected observations provide a new series of block and graft copolymers in which the A block will continue to be present at room temperature as a crystalline or semicrystalline phase in the presence of almost any non-crystalline structurally dissimilar block B, and yet when the temperature is increased polymer block A will melt and provide the melt flow characteristics highly desired in such thermoplastic systems. These desirable flow characteristics for block and graft copolymers are often not achieved, and therefore this discovery offers a class of copolymers having good physical properties coupled with excellent flow properties. To achieve this important and desirable goal, it is a requirement that the A block possess a certain level of crystallinity. If the crystallinity is too low, i.e. below 25 percent, then suitable phase separation of the A block will not occur especially in the presence of a polymer block B which is somewhat near the A block in solubility parameter. We require a minimal level of crystallinity for the A block to be 25 percent. If the crystallinity is higher, says 50 percent, then this is even more desirable. Polymer blocks with up to 100 percent crystallinity are acceptable.

For the purposes of this invention the level of polymer crystallinity can be established by several different techniques which are widely known in the art such as that obtained with x-ray techniques or employment of the measured densities of polymer blocks.

The following calculation permits the determination of percent crystallinity provided that the densities of the crystalline and amorphous polymer segments are available.

percent crystallinity $= (d - d_a)/(d_c - d_a) \times 100$ percent $d$ = density of polymer block, as measured $d_a$ = density of polymer block in completely amorphous state $d_c$ = density of polymer block in completely crystalline state (i.e. as obtained from X-ray unit cell measurements)

Alternatively the percent crystallinity can be determined for a polymer block directly by X-ray diffraction as will be shown below. In all cases the crystalline polymer blocks of this invention will be sufficiently crystalline to exhibit X-ray diffraction peaks by techniques well known to those skilled in the art.

There are many widely available and very desirable polymers which possess these suitable crystallinity levels. For example, polyethylene can possess varying levels of crystallinity, from 0 to 70 percent or higher. It is very convenient to create polyethylene polymer blocks with the desirable crystallinity levels required for this invention. Also, if the level of crystallinity is too low, one loses the useful properties of the plasticized products of this invention.

Examples of suitable A blocks in this invention provided they possess the proper crystallinity level are the isotactic polymers of propylene, 1-butene, 4-methyl-1-pentene, styrene, and other alpha-olefins, polyethylene, polycaprolactam, hexamethylene diamine-adipic acid polyamide and similar polyamides, poly(ethylene terephthalate) and similar polyesters, poly-(1,2-dimethylene cyclohexane), poly-(2,3-dimethylene-bicyclo-2,2,2-octane), polyethylene sulfide, polythiacyclobutane, etc.

These A blocks should have a minimum molecular weight of 5,000; preferably from 5,000 to 500,000; and most preferably from 10,000 to 250,000.

The A polymer blocks described above can be combined with a wide variety of B blocks. In the case of the B block we require a minimum molecular weight of 5,000, preferably from 5,000 to 500,000, most preferably from 10,000 to 250,000, and a softening point of at least 35°C., preferably at least 50°C. We require that the B block be substantially non-crystalline in order that adequate compatibility with plasticizer be maintained.

It is a further requirement of this invention that the A and B blocks be chemically dissimilar.

The criteria above clearly delineate what polymer blocks can be combined to create an acceptable phase separated block copolymer. There is an additional requirement that the selective plasticizer for the B block must also possess the requisite solubility parameter value. Ideally the selective plasticizer should have a solubility parameter identical to that of the B block. However, it is often desirable for reasons of economics, or for particularly desirable physical properties to employ a selective plasticizer which has a solubility parameter distinctly different from that of the B block ($\delta B$).

We have found that one can define solubility parameter of the selective plasticizer in the following manner: $\delta p$ should have a value such that $\delta p = \delta B \pm 1.20$, preferably $\delta p = \delta B \pm 0.9$.

There are occasions where certain plasticizers may seem operable outside of the above-cited ranges. However, if the plasticized system is conditioned at ambient temperature or at elevated temperatures for prolonged periods of time, those plasticizers which are outside the above constraint will usually bleed or exude from the copolymers and adversely affect the physical properties of said systems. This will be especially pronounced at higher levels of such undesirable plasticizers.

It is apparent that a rapid means of determining $\delta p$ of an appropriate plasticizer is desired. For many common non-volatile liquids these values are available in the *Polymer Handbook* (loc. cit). For certain oils which are highly valued in this invention for their excellent volatility, water resistance, and good economics, values of $\delta p$ are not readily available. In this case the values of $\delta p$ can be determined from the empirical formula $\delta = 4.1 \, (\delta/v^{1/3}) \, 0.43$ where V = molar volume of the plasticizer and $\gamma$ is the surface tension in dynes per centimeter. In this invention we will employ this approach to ascertain the $\delta$ of certain oils as plasticizers.

It is particularly significant that the plasticization of the B block which gives rise to a flexible continuous phase in this invention has relatively little effect on the crystalline A block. Again this is a manifestation of the strength and thermodynamic driving force of the crystallization process of the A block. This finding also means that the selection of the plasticizer for the B block can be made without regard to the effect of this plasticizer on the A block. For example, consider the block copolymer polyethylene—poly-t-butylstyrene-polyethylene, whose individual blocks possess virtually identical solubility parameters. If a substantially crystalline polyethylene block is employed, the crystalline melting points of 110° to 115°C. are observed for the A block. Substantial plasticization of the B block with dioctyl phthalate ($\delta = 7.9$) lowers these crystalline melting points only modestly, and the resulting flexible product maintains its excellent tensile properties up to a temperature near 100°C. In marked contrast a random copolymer of ethylene and t-butyl styrene is non-crystalline and when plasticized with 50 to 100 parts of dibutyl phthalate provides a product of little desirable physical properties.

The plasticization of block copolymers whose A blocks are crystalline is markedly advantageous over those block copolymers whose blocks are both amorphous. The plasticization of amorphous block copolymers requires that the solubility parameter of the plasticizer be closer to the B-block than the A-block. With block copolymers whose A blocks are crystalline the solubility parameter of the plasticizer is not so limited. Consequently a wider selection of useful plasticizers obtains.

Representative examples of copolymers which are suitable for use in the instant invention provided they fall within the above-defined general formulae are (A block being designated first):

polycaprolactam-polystyrene
hexamethylenediamine-adipic acid (Nylon 6,6)-polystyrene
polycaprolactam-poly-t-butylstyrene
polyethylene-polystyrene
polyethylene-poly-t-butyl styrene
[hexamethylenediamine-adipic acid (Nylon 6,6)]-(polyphenyl hydroxy ether of bisphenol A)
poly-(ethylene terephthalate)-polystyrene
poly-(ethylene terephthalate)-poly-t-butyl styrene
poly-(11-undecanoamide-polystyrene
poly ($\beta$-alanine)-polystyrene
poly-(1,2-dimethylene cyclohexane) - polystyrene
poly-(2,3-dimethylene-bicyclo-(2,2,2)-octane)-poly-t-butylstyrene
poly-(ethylene sulfide) - polyvinyl toluene
poly-(thiacyclobutane) - poly-alpha-methyl styrene For reasons of economics and general utility those multiphase thermoplastics which incorporate aromatic polymer blocks (especially polystyrene) are most preferred. Those systems involving polystyrene blocks can be employed with a wide range of non-volatile plasticizers ideally suited to this invention. Alternatively, polymer blocks based on poly-t-butylstyrene are desirable because these polymer blocks are readily solvated by non-volatile, inexpensive oils of an aliphatic composition. The availability and low cost of these oils, therefore, can provide plasticized systems of good properties and low cost. Each of these polymer blocks based on different aromatic monomers (for example, styrene and t-butyl styrene) will be solvated by different types of plasticizers and provide different properties suitable for different applications.

The preparative techniques for these polymer blocks is well-known (see *Preparative Techniques of Polymer Chemistry;* Sorenson and Campbell, Interscience Publishers, 1968) and the means of combining these various blocks with each other is now well-known in the polymer art. The anionic polymerization techniques of multiblock polymers is also well known.

In the compositions of the instant invention, preferably, the B block will comprise from 30 to 95 weight percent of said thermoplastic block or graft copolymer. Preferred copolymer types used in the instant invention are represented by formulas ABA, and ABABA, wherein A and B are as defined above. The ABA block copolymers are most preferred. In this most preferred copolymer the B block will comprise from 45 to 90 weight percent of said total copolymer, more preferably from 50 to 80 weight percent.

The plasticizer which will be used in preparing the novel compositions of the instant invention may also be selected with reference to any table on solubility parameters. Some specific examples are diisodecylphthalate (7.2); dioctylphthalate (7.9); ethylbenzoate (8.2); tricresyl phosphate (8.4); dioctyl sebacate (8.6); dioctyl adipate (8.7); di-n-hexyl phthalate (8.9); dibutyl sebacate (9.2); dibutylphthalate (9.3); diethylphthalate (10.0); dipropylphthalate (9.7). Oils having a specific gravity of 0.885 and an aromatic/paraffinic/naphthenic volume percent of about 1/13/86 percent (7.3). The plasticizer may be added to the thermoplastic block copolymer by techniques which are known to the skilled artisan, for example, the plasticizer may be milled with said thermoplastic block copolymer or the thermoplastic block copolymer and the plasticizer may be dissolved in a suitable solvent, and the solvent evaporated. In general, the thermoplastic block copolymer of the instant invention may be compounded with from 25 to 300 parts per hundred plasticizer, more preferably from 40 to 200.

The preferred thermoplastic block copolymers utilized in preparing the novel compositions of the instant invention are block copolymers of crystalline polyolefins with polyvinyl aromatics. Monomers which are useful for preparing said vinyl aromatic polymer blocks include styrene, t-butyl styrene, p-vinyl-toluene, $\alpha$-methyl styrene. By use of vinyl aromatic polymeric blocks, compositions loaded with high amounts of plasticizer and having good polymer properties may be prepared. For example, hydrocarbon oil type plasticizers may be conveniently used with block copolymers wherein polyethylene comprises the A block and t-butyl styrene comprises the B block. These systems are novel oil-extended plastics and retain properties which are equivalent to more expensive materials while being characterized as being more economical. Oil extended polyethylene-t-butyl styrene-polyethylene block copolymers may be formulated wherein the hydrocarbon oil content will comprise up to 70 percent by weight of said total composition. As further described below, compositions of this sort will still retain good polymer toughness, i.e. elongation plus tensile strength.

Plasticizers which can be used in this invention, especially with t-butyl styrene copolymers, include low molecular weight polymeric oils such as polypropylene, polybutene, ethylene-propylene copolymers such as squalane and other synthetic ethylene-propylene copolymers, polybutadiene, polyisoprene, etc. Although these materials can be excellent plasticizers it is difficult to predict their compatibilities with different polymer blocks since compatibility of these oils is a function not only of composition but also of molecular weight. Solubility parameters readily determined for higher molecular weight species or solubility parameters calculated from the molar attraction constants of functional groups may not be available for a particular lower molecular weight species. In this event plasticizers for multiphase copolymers described above may be readily selected by the following simple test. One gram of homopolymer B is combined with 100 grams of the prospective plasticizer and heated to a temperature near or above the softening point of the homopolymer and then cooled to room temperature. If homopolymer B dissolves under these conditions, the liquid medium will make an acceptable plasticizer for the system.

The poly-alpha-olefins, ethylene-alpha-olefin copolymers, and polydienes which are useful plasticizers in this invention possess molecular weights of 3,000 or under, preferably of 1,500 or under, and viscosities at 25°C. of 50 strokes or less, preferably 30 stokes or less.

Examples of suitable plasticizers for a polystyrene block are: dibutyl phthalate, dihexyl phthalate, dioctyl phthalate, tributyl phosphate, etc. Other suitable plasticizers for a poly(-t-butyl styrene) block are: paraffinic based oils, didecyl phthalate, ditridecyl-phthalate, etc. Suitable plasticizers for a block polymer of polyphenyl-hydroxy ether of bisphenol A are diethyl phthalate, dibutyl phthalate, and low molecular weight condensation polyesters of 1,4-butane diol and adipic acid or 1,6-hexane diol and adipic acid, said polyesters being liquid and having viscosities at room temperature of 500 to 50,000 centipoises. Suitable plasticizers for a polyvinyl acetate block are diethyl phthalate, dibutyl phthalate, dihexyl phthalate, tributyl phosphate, etc.

The copolymers of the instant invention may be prepared by either of three well-known polymerization techniques: (1) the preparation of terminally functional polymers followed by condensation reactions, or (2) addition polymerization during which one monomer is added and completely polymerized and then another added until the desired number of blocks are obtained, or (3) the hydrogenation of the polybutadiene portion of block copolymers wherein the A blocks consist of polybutadiene predominantly in the 1,4- configuration thereby producing block copolymers with crystalline polyethylene A blocks.

In the case of the terminally functional polymers preparative techniques for these polymer blocks are well known (see, for example, *Preparative Techniques of Polymer Chemistry*, Sorenson and Campbell, Interscience Publishers, 1968), and the means of combining these various blocks with each other is not well known in the polymer art. The condensation of terminally functional polymers results in block copolymers generally described by Formula III.

The highly desirable A-B-A and A-B-A-B-A block copolymers frequently can be prepared by strict addition polymerization procedures involving anionic initiators. However, where crystalline A blocks are desired synthesis must be restricted to terblock A-B-A copolymers on the one hand and to the use of difunctional initiators on the other hand. Monofunctional initiators cannot be used since the A segment must be formed first, and since the A block is crystalline it precipitates from solution prior to the addition of the B monomer, thereby preventing the preparation of clean block copolymers. However, if a difunctional initiator is used and the middle non-crystalline and soluble B block is formed first, the addition of the monomer producing crystalline end blocks will produce at least some of the crystalline end blocks. Good examples of such block copolymers are those whose A blocks are derived from 1,2-dimethylene cyclohexane, 2,3-dimethylene-bicyclo-(2,2,2)-octane, or cyclic sulfides such as ethylene sulfide or thiacyclobutane and whose B blocks are vinyl aromatics such as styrene, vinyl toluene, alpha-methyl styrene, t-butylstyrene and the like.

Hydrogenation of 1,4-polybutadiene containing block copolymers to produce segments which are crystalline polyethylene provides essentially the only unambiguous method by which such polyethylene containing copolymers can be prepared. Ideally the polyethylene containing block copolymers are the A-B-A and the A-B-A-B-A types. The multiblock copolymers containing 1,4-polybutadiene blocks can be prepared by the procedures described using anionic initiators, either monofunctional or difunctional.

The hydrogenation of the block copolymers can be carried out catalytically using conventional hydrogenation procedures. The copolymer is dissolved in an inert solvent, such as cyclohexane, and the copolymer solution and hydrogenation catalyst are added to a high pressure autoclave. The autoclave is pressured with hydrogen to about 100 to 3,000 psig., and then heated to 50° to 220°C. for about 1 to 24 hours while mixing. The reactor is then depressurized, the catalyst removed by filtering the hot solution, and the hydrogenated copolymer recovered by steam stripping, anti-solvent precipitation, or simply cooling the solution and filtering the precipitated semi-crystalline mass. Any material functioning as an olefin hydrogenation catalyst can be used; suitable catalysts include Raney nickel, platinum oxide, platinum on alumina, palladium on charcoal, copper chromate, nickel supported on kieselguhr, molybdenum sulfide, and the like.

The hydrogenation of 1,4-polybutadiene containing block copolymers can also be accomplished with the reagent diimide (H-N=N-H). This reagent can be generated safely and conveniently through the thermal decomposition of p-toluene-sulfonyl hydrazide in refluxing aromatics, such as toluene or xylene. The block copolymer is dissolved in the aromatic solvent, p-toluenesulfonyl hydrazide added in excess, and the solution heated to reflux. When hydrogenation has been completed the p-toluenesulfonic acid that forms as a result of the thermal decomposition of the hydrazide is filtered off hot, and the hydrogenated copolymer isolated by steam stripping, anti-solvent precipitation, evaporation, or cooling the solution and filtering the separated solid copolymer.

Preferably A-B-A and A-B-A-B-A block copolymers are prepared so that they are substantially free of either homopolymer, A or B, and A-B diblocks. The presence of homopolymer A is least harmful and up to about 30 percent by weight can be tolerated. Homopolymer B functions much as a diluent, and up to 20 percent by weight can be tolerated to produce plasticized systems with good physical properties. The presence of A-B diblocks is most deleterious and, for plasticization to result in compositions having good properties, the amount of A-B diblock cannot exceed 10 percent by weight. In all cases, it is most preferred that the compositions of the instant invention are substantially free of homopolymer, and diblock impurities, e.g. less than 10 percent by weight total impurities.

Random and statistical copolymers are specifically excluded from this invention because they do not provide the phase separated products which we require. Also excluded are 3 block copolymers of the BAB type—which have undesirable features for the purpose of this invention.

It is to be noted that we have generally required block or graft copolymers wherein the B block comprises at least 30 percent of the total polymer and most preferably 50 percent. The reason for this is that when the B block is plasticized, the resulting plasticized phase should constitute the continuous phase. This will generally occur provided the B block plus plasticizer constitutes the major portion of the block polymer plus plasticizer. If the B block constitutes only 25 percent of the polymer and a relatively low level of plasticizer is added (say 25 parts per 100 of polymer) then the total of B block and plasticizer will only constitute 50 parts of the total of 125 parts of product. Under these circumstances, the B block and plasticizer normally will not constitute the continuous phase and a non-flexible product will result.

Compositions prepared according to the teachings of this invention are flexible high strength plastics. These plasticized compositions are very useful for making extruded clear film with good low temperature properties and excellent resistance to plasticizer extraction by water. Hose and tubing extruded from these materials have an excellent assemblage of physical properties. When calendared on a suitable fabric base, a flexible product similar to leather is obtained which can be embossed or printed for decorative purposes. Thus, these products are useful in many applications including injection molded items.

The following are specific embodiments of the instant invention. There is, however, no intent to be bound by the examples described below.

EXAMPLE 1

A 20.3 wt. percent butadiene- 59.4 wt. percent styrene-20.3 wt. percent butadiene three-block copolymer was prepared under anhydrous and anaerobic conditions. To 1,000 ml. of benzene contained in a polymerization vessel was charged 1.88 meq. of n-butyllithium. Then was added 41.1 g. (0.760 mole) of butadiene and the solution stirred for about 1 hour. Then was added 120.0 g. (1.152 mole) of styrene, and the solution was stirred for 30 minutes. Finally 41.1 g. of butadiene (0.760 mole) was added and the solution stirred for about 1 hour. The reaction was terminated through the addition of methanol containing some inhibitor (di-t-butyl catechol). The block copolymer was isolated by precipitation of the polymer solution is methanol, washing the precipitated polymer with methanol containing di-t-butyl catechol inhibitor, and drying the resultant powder in a vacuum over at 60°C.

The compression molded block copolymer was a clear and transparent plastic. Gel permeation chromatography (GPC) showed the block copolymer to be essentially 3-block and to possess a narrow molecular weight distribution. The overall degree of polymerization (DP) of this block copolymer was at least 1,421.

A differential scanning calorimeter (DSC) was used to determine thermal transitions corresponding to the glass transition temperatures (Tg) and/or to the melting temperatures (Tm) of the blocks in this copolymer and subsequently described copolymers. In this butadiene-styrene-butadiene block copolymer a transition was observed at about −96°C., and this corresponds to the glass transition temperature of polybutadiene. However, a glass (softening) transition (Tg) for polystyrene, normally occurring near 100°C., was not observed.

The butadiene-styrene-butadiene was hydrogenated to the corresponding polyethylene-polystyrene-polyethylene as follows: 9.0 grams of the copolymer (67.6 mmoles of butadiene units or mmoles of unsaturation) was dissolved in 200 ml of anhydrous benzene under nitrogen.

The solution was heated to about 70°C. and 18.6 g (100 mmoles) of p-toluenesulfonyl hydrazide was added. The solution was heated to reflux (108°C.) and the solution was refluxed for 5 hours. A cloudy solution resulted and the vessel walls were coated thinly with a solid (p-toluenesulfinic acid resulting from the decomposition of p-toluenesulfonyl hydrazide to produce the hydrogenation agent, diimide H-N=N-H). When the solution was permitted to cool, a gel formed illustrating that the hydrogenation was effective since the polyethylene blocks were crystallizing, and the copolymer precipitated from solution. The hot solution was filtered and then treated with methanol to fully precipitate the polyethylene-polystyrene-polyethylene block copolymer. The precipitated polymer was collected on a filter, washed with methanol, and redissolved in hot toluene. The clear solution that resulted was treated with methanol, and the precipitated polymer was collected, washed, and dried in a vacuum oven at 60°C. There were recovered 8.0 grams of dried polymer. A compression molded specimen of the hydrogenated copolymer was clear and transparent.

The differential scanning calorimeter (DSC) showed that the initial transition at −96°C. corresponding to polybutadiene had disappeared. However, two other transitions appeared, i.e. one at 104°C. believed to correspond to the glass transition of polystyrene, and a melting transition at 87°C. believed due to the melting of the crystalline polyethylene.

The PE-polystyrene-PE block copolymer was plasticized as follows: 2.0 g of copolymer was slurried in 25 ml of benzene containing 0.1% di-t-butyl catechol inhibitor, and 1.2 g of di-n-hexyl phthalate ($\delta = 8.9$) was added. This corresponds to 60 parts of plasticizer per 100 of copolymer. The mixture was poured into a shallow pan, and the solvent was removed by heating in a vacuum oven. The resultant plasticized composition was homogenized on a rubber mill.

Using a TMA (thermomechanical analyzer, which measures thermal transitions in polymers as a result of changes in modulus or softness) two transitions were observed in the plasticized copolymer, one at 73°C. corresponding to the melting temperature (Tm) of the polyethylene block and one at −32°C. corresponding to the glass transition temperature (Tg) of the plasticized phase (polystyrene plus di-n-hexyl phthalate). Thus, a substantially selective plasticization of the polystyrene phase occurred without substantially affecting the crystalline polyethylene phase. A compression molded specimen of the plasticized composition at 25°C. possessed a tensile strength of 430 psi and an elongation of 730 percent and was flexible, clear and transparent.

This example demonstrates that polyethylene-polystyrene-polyethylene block copolymers can be selectively plasticized with phthalate esters to produce flexible compositions with good physical properties and excellent low temperature properties.

EXAMPLE 2

The PE-polystyrene-PE block copolymer described in Example 1 was mixed with 60 parts by weight diethyl phthalate ($\delta = 10.0$) per 100 of copolymer according to the procedure described in Example 1. Thermomechanical analysis showed a transition at 78°C. corresponding to the melting point of the polyethylene phase and a transition at 7°C. corresponding to the plasticized phase (polystyrene plus diethyl phthalate).

The compression molded specimen of the plasticized composition was flexible, clear and transparent and possessed a tensile strength of 1,315 psi and an elongation of 610 percent at 25°C.

EXAMPLE 3

Under the general conditions described in Example 1 a 15.3 wt. percent butadiene-69.4 wt. percent styrene-15.3 wt. percent butadiene block copolymer was prepared. The compression molded block copolymer was a stiff and brittle but clear and transparent plastic. GPC showed it to be essentially 3-block and to possess a narrow molecular weight distribution. The block copolymer possessed a DP of at least 1,425.

A DSC thermogram showed a transition at about −98°C. corresponding to the Tg of polybutadiene and a transition at about 104°C. corresponding to the Tg of polystyrene.

The block copolymer was hydrogenated according to the procedure described in Example 1. From 9.0 grams (50 mmoles of unsaturation) of starting polymer, which was treated with 18.6 grams (100 mmoles) of p-toluenesulfonyl hydrazide, was obtained 8.8 grams of dry polymer. A compression molded specimen was clear and transparent.

The DSC of the hydrogenated copolymer showed the absence of the polybutadiene transition but the presence of a melting transition at 95°C. corresponding to the melting point of the polyethylene blocks. The transition due to the polystyrene block was not detected; however, this transition may have been obscured by the broad melting transition at 95°C.

The PE-polystyrene-PE block copolymer was mixed with 60 parts by weight of di-n-butyl phthalate ($\delta = 9.3$) per 100 of copolymer according to the procedure described in Example 1. A compression molded specimen of the plasticized copolymer was flexible, clear, and transparent. Thermomechanical analysis of the plasticized copolymer showed a transition at 83°C. corresponding to the polyethylene melting point and a transition at −22°C. corresponding to the plasticized phase, i.e. polystyrene plus plasticizer. The plasticized copolymer possessed a tensile strength of 365 psi and an elongation of 565 percent at 25°C.

This example illustrates that a 15PE-70 polystyrene-15PE can be plasticized with a phthalate ester to produce flexible products with good properties.

EXAMPLE 4

Under the general conditions described in Example 1, a 19.8 wt. percent butadiene- 60.4 wt. percent t-butylstyrene - 19.8 wt. percent butadiene block copolymer was prepared. A compression molded specimen of the block copolymer was clear and transparent but stiff and brittle. GPC showed the block copolymer to be essentially 3-block and to possess a narrow molecular weight distribution. The block copolymer possessed a DP of at least 1,384.

A DSC thermogram showed a transition at −93°C. corresponding to the Tg of polybutadiene but no transition corresponding to the Tg of poly-t-butylstyrene (generally around 140°C.).

The block copolymer was hydrogenated according to the procedure described in Example 1. From 6.75 grams (50 mmoles of unsaturation) of starting polymer, which was treated with 18.6 grams (100 mmoles) of p-toluenesulfonyl hydrazide, was obtained 6.0 grams of dry polymer. A compression molded specimen was clear and transparent.

The DSC of the hydrogenated copolymer showed the absence of a transition at −93°C. but the presence of a melting transition at 84°C. corresponding to the melting temperature of the polyethylene blocks and a transition at 136°C. corresponding to the Tg of poly-t-butylstyrene.

The amount of crystallinity present in the polyethylene phase was estimated by the use of X-ray analysis. This method is based on the assumption that the percent crystallinity is equal to:

$$\% \text{ Crystallinity} = 100 \times \frac{\text{Area of crystalline peaks}}{\text{Total diffracted area of specific polymer phase}}$$

The X-ray diffraction of the polyethylene-poly-t-butylstyrene-polyethylene block copolymer was conducted over the diffraction angles of $2\theta = 2°$ to $55°$. Pronounced peaks were observed at 21.3° and 23.2° which correspond to the diffraction peaks of the (110) and (200) patterns in crystalline polyethylene. The presence of these peaks demonstrated that the degree of crystallinity of the polyethylene phase present in the block copolymer was quite substantial.

To determine the percent crystallinity on a quantitative basis the crystalline peak area was measured as 0.125 area units and assumed to originate only from the crystalline polyethylene phase. Since poly-t-butylstyrene is non-crystalline, this assumption is valid. The total diffraction area was measured and assumed to result from the combined scattering of the polyethylene and poly-t-butylstyrene. This total scattering area was then calculated and found to be 1.04 area units. Because the polyethylene phase represented only 40 percent of the total polymer phase, the area attributed to the PE phase was calculated to be $0.40 \times 1.04 = .416$ area units.

Therefore, the percent crystallinity attributed to the polyethylene phase is $100 \times 0.125/0.416 = 30$ percent Repeated calculations of this nature generally gave values of 30 percent ± 5 percent. The nature of this calculation generally involves this amount of error. it is estimated that a maximum error of 10 percent could be involved but this is highly dependent on the amount of crystallinity present in the crystalline phase, and the fraction that this latter phase represents of the entire block polymer.

The PE-poly-t-butylstyrene-PE block copolymer was mixed with 60 parts by weight of dioctyl phthalate ($\delta = 7.9$) per 100 of copolymer according to the procedure described in Example 1. The solubility parameter of dioctyl phthalate is very close to the solubility parameter of polyethylene ($\delta = 8.1$) and were the polyethylene not crystalline it would plasticize the polyethylene. A compression molded specimen of the plasticized composition was flexible, clear, and transparent. Thermomechanical analysis showed a transition at 74°C. corresponding to the melting of polyethylene and a transition at −27°C. corresponding to the Tg of the plasticized phase (poly-t-butylstyrene plus dioctyl phthalate). The plasticized composition possessed a tensile strength of 975 psi and an elongation of 870 percent at 25°C.

This example illustrates the plasticizers with solubility parameters identical to the crystalline block can be used to plasticize the amorphous blocks and obtain strong, flexible products. The solubility parameter of the crystalline block places no limitations on the choice of plasticizer for the amorphous blocks. This example further illustrates that PE-poly-t-butylstyrene-PE block copolymers can be plasticized to produce flexible products with excellent properties.

EXAMPLE 5

The PE-poly-t-butylstyrene-PE block copolymer described in Example 4 was mixed with 60 parts by weight ditridecyl phthalate per 100 of copolymer according to the procedure described in Example 1. A compression molded specimen was flexible, clear, and transparent. Thermomechanical analysis showed a transition at 75°C. corresponding to the melting of polyethylene and a transition at −18°C. corresponding to the Tg of the plasticized phase (poly-t-butylstyrene plus ditridecyl phthalate). The plasticized composition possessed a tensile strength of 1,200 psi and an elongation of 870 percent.

EXAMPLE 6

Under the general conditions described in Example 1 a 14.8 wt. percent butadiene- 70.4 wt. percent t-butylstyrene-14.8 wt. percent butadiene block copolymer was prepared. A compression molded specimen was stiff and brittle but clear and transparent. GPC showed the block copolymer to be essentially 3-block and to possess a narrow molecular weight distribution. The block copolymer possessed a DP of at least 1,385.

A DSC thermogram showed a transition at −98°C. corresponding to the Tg of polybutadiene but no transition corresponding to the Tg of poly-t-butylstyrene (generally around 140°C.).

The block copolymer was hydrogenated according to the procedure described in Example 1. From 6.75 grams (37.5 mmoles unsaturation) of starting polymer, which was treated with 18.6 grams (100 mmoles) of p-toluene-sulfonyl hydrazide, was obtained 6.0 grams of dry polymer. A compression molded specimen was clear and transparent.

The DSC of the hydrogenated copolymer showed the absence of a transition at −98°C. but the presence of a melting transition at 96°C. No transition for poly-t-butylstyrene was detected.

The PE-poly-t-butylstyrene-PE block copolymer was mixed with 60 parts by weight of Primol D ($\delta = 7.3$) per 100 of copolymer according to the procedure described in Example 1. Primol D is a white oil having an average molecular weight of about 500 by vapor pressure osometry, based on paraffinic and naphthenic hydrocarbons with a specific gravity at 15.6°C. of 0.885 and with a kinematic viscosity measured at 20°C. of 240 centistokes, and a refractive index at 20°C. of 1.4823. A compression molded specimen of the plasticized composition was flexible, clear, and transparent. Thermomechanical analysis showed a transition at 80°C. corresponding to the melting of polyethylene and a transition at −29°C. corresponding to the Tg of the plasticized phase (poly-t-butylstyrene plus Primol D). The plasticized composition possessed a tensile strength of 435 psi and an elongation of 340 percent.

This example illustrates the use of hydrocarbon oils as plasticizers for the amorphous phases of 3 block copolymers whose end blocks consist of crystalline polyethylene segments.

EXAMPLE 7

Preparation of Polystyrene-poly-(piperazine sebacamide) Multiblock Copolymer

To a dry reaction vessel was added 0.2112 g. of toluene diisocyanate and 0.0496 g. of triethylene diamine in 5.0 ml. toluene. To this mixture was added 3.187 g. of polystyrene glycol (molecular weight = 4550) in 20 ml. of toluene. The reaction mixture was heated to 40°C. and maintained at this temperature for about 18 hours. To the isocyanate capped polystyrene glycol was added 4.75 g. of poly-(piperazine sebacamide) (molecular weight = 679) in 50 ml. methylene chloride, and the reaction carried out for an additional 2 hours. Reaction was then terminated by the addition of 5 ml of 4 percent aqueous dibutyl amine. Heptane was added to precipitate the block copolymer, and the fibrous polymer was filtered and dried in a vacuum oven at 50°C. for 6 hours. The polymer reduced viscosity measured in methylene chloride (0.2 gms/100 ml.) was found to be 0.85.

A compression molded (at 175°–200°C.) film was clear and transparent. A DSC thermogram on an annealed compression molded specimen showed the presence of a softening transition at 85°C. corresponding to the Tg of polystyrene and a melting transition at 170°C. corresponding to the Tm of poly-(piperazine sebacamide).

Plasticization of the Multiblock Copolymer

One gram of the multiblock copolymer was dissolved in about 20 ml. of methylene chloride, and 0.4 g. of dibutyl phthalate was added to the solution. The solvent was evaporated in a shallow pan in a vacuum oven at 50°C. The plasticized composition was compression molded at 175°–190°C. to produce a rubbery, flexible film that was clear and transparent. A DSC thermogram showed a melting transition at 160°C. corresponding to the Tm of poly-(piperazine sebacamide) and the absence of the Tg due to polystyrene.

This example shows that multiblock copolymers containing alternately crystalline blocks and amorphous blocks can be selectively plasticized in the amorphous phase to produce flexible, clear, and strong compositions.

What is claimed is:

1. Plasticized thermoplastic copolymers wherein said copolymer is selected from the group consisting of block copolymers having the general formulae,
   I. A-B-A
   II. A-B-A-B-A
   and
   III. xB-[A-B]$_n$ -yA;
   and graft copolymers having the general formula (IV) 

wherein $m$ and $n$ are integers greater than 1; $x$ and $y$ are 0 or 1, and $y$ is 0 when $n$ is 2; A and B are mutually incompatible thermoplastic polymer blocks, having a molecular weight of at least 5,000 and said A block is a crystalline polymer block having a degree of crystallinity of at least 25 percent, said B block is a substantially noncrystalline polymer block, and the B block having a glass transition temperature of at least 35°C.; and said plasticizer is selected from the group consisting of plasticizers having a solubility parameter within 1.20 units of the solubility parameter of said B block.

2. Compositions of claim 1 wherein said A blocks are selected from the group consisting of isotactic polymers of propylene, 1-butene, and 4-methyl-1-pentene, polyethylene, polycaprolactam, hexamethylene diamineadipic acid polyamide, poly(ethylene)terephthalate, poly(1,2-dimethylene cyclohexane), poly(2,3-dimethylene-bicyclo-2,2,2-octane), polyethylene sulfide and polythiacyclobutane.

3. The process of claim 2 wherein B is a polyvinyl aromatic polymer block.

4. The composition of claim 3 wherein A is a crystalline polyolefin and B is a polyvinyl aromatic.

5. The composition of claim 4 wherein said polyvinyl aromatic polymer block is selected from the group consisting of polystyrene, poly-t-butylstyrene, polyvinyl toluene and poly-α-methylstyrene.

6. The composition of claim 5 wherein said crystalline polyolefin polymer block is selected from the group consisting of polypropylene and polyethylene.

7. The composition of claim 6 wherein said plasticizer comprises from 25 to 300 parts per hundred copolymer.

8. The composition of claim 7 wherein $n$ and $m$ are less than 100.

9. The composition of claim 8 wherein said crystalline polyolefin has a degree of crystallinity of at least 50 percent.

10. The composition of claim 9 wherein said plasticizer has a solubility parameter within 0.9 units of the solubility parameter of said B block.

11. Plasticized thermoplastic copolymers wherein said copolymer is selected from the group consisting of block copolymers having the general formulae,
    I. A-B-A
    and
    II. A-B-A-B-A
wherein A and B are mutually incompatible thermoplastic polymer blocks having a molecular weight of at least 5,000 and said A blocks are crystalline polymer blocks having a degree of crystallinity of at least 25 percent, and said B blocks are substantially noncrystalline polymer blocks, and the B block having a glass transition temperature of at least 35°C.; and said plasticizer is selected from the group consisting of plasticizers having a solubility parameter within 1.20 units of the solubility parameter of said B block.

12. The composition of claim 11 wherein said A blocks are selected from the group consisting of isotactic polymers of propylene, 1-butene, and 4-methyl-1-pentene; polyethylene, polycaprolactam, hexamethylene diamine-adipic acid polyamide, poly(ethylene)-terephthalate, poly(1,2-dimethylene cyclohexane), poly(2,3-dimethylene-bicyclo-2,2,2-octane), polyethylene sulfide and polythiacyclobutane.

13. The composition of claim 12 wherein B is a polyvinyl aromatic polymer block.

14. The composition of claim 13 wherein A is a crystalline polyolefin and B is a polyvinyl aromatic.

15. The composition of claim 14 wherein said polyvinyl aromatic polymer block is selected from the group consisting of polystyrene, poly-t-butylstyrene, polyvinyl toluene and poly-α-methyl styrene.

16. The composition of claim 15 wherein said crystalline polyolefin polymer block is selected from the group consisting of polypropylene and polyethylene.

17. The composition of claim 16 wherein said plasticizer comprises from 25 to 300 parts per hundred copolymer.

18. The composition of claim 17 wherein $n$ and $m$ are less than 100.

19. The composition of claim 18 wherein said crystalline polyolefin has a degree of crystallinity of at least 50 percent.

20. The composition of claim 19 wherein said plasticizer has a solubility parameter within 0.9 units of the solubility parameter of said B block.

21. The composition of claim 11 wherein said copolymer is of the A-B-A type, and A is polyethylene and B is polystyrene.

22. The composition of claim 21 wherein said plasticizer is selected from the group consisting of dibutylphthalate, dioctylphthalate, dihexylphthalate and tributylphosphate.

23. The composition of claim 11 wherein said copolymer is of the A-B-A type, A is polyethylene and B is poly-t-butylstyrene.

24. The composition of claim 23 wherein said plasticizer is selected from the group consisting of paraffinic based oils, didecylphthalate, and ditridecylphthalate.

25. The composition of claim 24 wherein said plasticizer is selected from the group consisting of low molecular weight liquid polypropylene, polybutene, ethylene-propylene copolymers, polybutadiene and polyisoprene, said plasticizer being further characterized as having a molecular weight of less than 3,000.

* * * * *